(12) United States Patent
Berg

(10) Patent No.: US 7,510,349 B2
(45) Date of Patent: Mar. 31, 2009

(54) OCEAN BOTTOM SEISMIC STATION INSTALLATION

(75) Inventor: Arne Berg, Kattem (NO)

(73) Assignee: Optoplan AS, Trondheim (NO)

( * ) Notice: Subject to any disclaimer, the term of this patent is extended or adjusted under 35 U.S.C. 154(b) by 214 days.

(21) Appl. No.: 11/379,480

(22) Filed: Apr. 20, 2006

(65) Prior Publication Data
US 2007/0248417 A1 Oct. 25, 2007

(51) Int. Cl.
*F16L 1/12* (2006.01)
(52) U.S. Cl. ........................... 405/158; 405/166
(58) Field of Classification Search ............ 405/154.1, 405/158, 166, 168.1, 168.3
See application file for complete search history.

(56) References Cited

U.S. PATENT DOCUMENTS

| | | | |
|---|---|---|---|
| 3,331,212 A * | 7/1967 | Cox et al. ................. | 405/168.3 |
| 3,819,847 A | 6/1974 | Charles | |
| 4,647,253 A | 3/1987 | Jacobson et al. | |
| 5,624,207 A | 4/1997 | Berges | |
| 5,655,753 A | 8/1997 | Berges et al. | |
| 6,070,857 A | 6/2000 | Dragsund et al. | |
| 6,296,118 B1 | 10/2001 | Speck | |
| 6,350,085 B1 * | 2/2002 | Bath et al. ................ | 405/154.1 |
| 6,588,980 B2 * | 7/2003 | Worman et al. ............. | 405/158 |
| 2002/0172562 A1 * | 11/2002 | Worman et al. ............. | 405/161 |
| 2003/0159877 A1 | 8/2003 | Martin et al. | |
| 2003/0223822 A1 * | 12/2003 | Oldervoll et al. ............ | 405/158 |
| 2004/0065443 A1 | 4/2004 | Berg et al. | |
| 2006/0196989 A1 | 9/2006 | Bartley et al. | |

FOREIGN PATENT DOCUMENTS

| | | |
|---|---|---|
| GB | 2 278 829 | 12/1994 |
| WO | WO 2004/068012 | 8/2004 |

OTHER PUBLICATIONS

GB Search Report, Application No. GB 0707511.2, dated Jul. 11, 2007.
Norway Search Report Action, Application No. 2006 1732, Dated Nov. 20, 2006.

* cited by examiner

*Primary Examiner*—Frederick L Lagman
(74) *Attorney, Agent, or Firm*—Patterson & Sheridan, LLP

(57) ABSTRACT

Storage and installation systems used in storage, deployment or retrieval of a seismic cable array include one or more baskets adapted for being stacked. Each basket is dimensioned to allocate, in an ordered arrangement, a number of seismic stations interconnected by sections of seismic cable. Corresponding methods of storing a seismic cable and deploying/retrieving a seismic cable are based on the use of baskets having an ordered arrangement of seismic stations.

15 Claims, 6 Drawing Sheets

OCEAN BOTTOM SEISMIC STATION INSTALLATION

BACKGROUND OF THE INVENTION

1. Field of the Invention

Embodiments of the invention relate in general to seismic surveying using deployable cables containing transducers/sensors for the sensing of received acoustic signals at subsea locations resulting from a generated seismic signal. More particularly, embodiments relate to a device and a method for storing and handling a seismic cable incorporating a number of seismic stations for use in seismic surveying at offshore locations. Operations related to deployment and retrieval of such cables are generally aimed at placing a seismic cable on the sea bottom, normally in a trench, under different weather conditions, and with a failure rate as low as possible.

2. Description of the Related Art

Installation of subsea cables is now a common procedure performed by a number of operators, often using purpose-built or purpose-equipped vessels. U.S. Pat. Nos. 5,624,207 and 5,655,753 to Berges, et al. describe an ocean bottom cable handling system and method of using the system where the cable is stored in large storage bins onboard a vessel.

Typically, such subsea cables are very long and consist of a small number of discontinuities, e.g. regenerators. When repeaters are included along the cable, such repeaters usually requires special handling, such as e.g. hand carrying, in the deployment apparatus onboard a vessel, in order to ensure that no damage is made to the repeaters.

A typical procedure for the installation of a seismic cable involves the handling of a long cable, interrupted by many sensor stations. U.S. Pat. No. 6,070,857 describes a device for the storage and deployment of ocean bottom seismic cable on a vessel comprising a rack on which the long length of seismic cable is suspended prior to deployment into the sea.

U.S. Pat. No. 4,647,253 describes a large capacity, cable turntable assembly for use in connection with laying long lengths of underwater cable. The turntable may be positioned on a shore side support, permitting rotation of the turntable in order to load the cable onto the turntable. The turntable may then be moved laterally onto a support surface on a floating platform, such as a barge.

United States Patent Application Publication No. US 2003/0159877 A1, to Martin, et al., describes a method of performing a seismic survey of a hydrocarbon reservoir at an offshore location where a seismic cable is deployed into a lined trench on the seabed. The cable is deployed from a drum on a remotely operated vehicle.

United States Patent Application Publication No. US 2004/0065443 A1, to Berg, et al., describes an apparatus and method for transporting, deploying, and retrieving an array of a plurality of nodes interconnected by sections of cable. An apparatus and a method for transporting, deploying and retrieving a preassembled fiber optic in-well seismic array having a plurality of fiber optic sensors, clamp mechanisms, and sections of cables between sensors is described.

As described in published United States Patent Application No. US 2004/0065443 A1, difficulties are encountered when the sections of cable and the nodes are wound on to or unwound from a cable drum or other carrying device, due to the size, shape and construction of the nodes. Typically, the nodes constitute bulges on a cable, and the nodes are typically less flexible than the other sections of a seismic cable.

A further limitation of present solutions for seismic cable storage, deployment and retrieval is that a heavy and long cable has a tendency to move and unwind from the drum. Also, if there are a number of seismic stations on a seismic cable, the cable may easily become trapped between other layers of cable or behind seismic stations and an entangled cable may result in kinks or even eventual breakage of the cable.

Deployment and retrieval of seismic cables which include a large number of sensor points or sensor stations with interconnecting cable is presently a challenge for most installation companies.

There exists a need for an improved storage and installation device for use in a cable deployment and retrieval system which may facilitate a more efficient and predictable deployment and retrieval of seismic cables and a method which enables improved functionality while reducing the above mentioned limitation of present solutions.

SUMMARY OF THE INVENTION

One aspect of the invention provides a storage and installation system or device for use in storage, deployment or retrieval of a seismic cable array. The storage and installation device includes one or more baskets adapted for being stacked. Each basket is dimensioned to allocate, in an ordered arrangement, a number of seismic stations interconnected by sections of seismic cable, whereby the ordered arrangement achieves reduced tangling and a more predictable deployment operation. The ordered arrangement can in one embodiment of the invention be in the form of a single layer type arrangement of the seismic stations within each basket.

In one embodiment of the storage and installation device according to the invention, seismic stations with a substantially non-circular cross section in a direction perpendicular to the cable direction are arranged in baskets, in such a way that the seismic stations are placed in the basket(s) in predefined orientations.

In another embodiment of the storage and installation device according to the first aspect of the invention, the seismic stations may have a substantially circular cross section perpendicular to the cable direction.

In another embodiment of the storage and installation device according to the first aspect of the invention, a basket is provided with arrangement details for placing the seismic stations in prepositioned regions or positions in the basket(s). Such arrangement detail may in one alternative comprise a basket center volume defined by a cylindrical center element of the basket.

In yet another embodiment of the storage and installation device according to the first aspect of the invention, coupling details, e.g. in the form of slits or openings of a peripheral wall define the positions of and hold seismic stations in predetermined positions in relation to said peripheral wall.

In still another embodiment of the storage and installation device according to the first aspect of the invention, a number of elongated stands, in normal use arranged in a substantially parallel, vertically upright fashion, are adapted to hold the seismic stations in prepositioned locations with defined orientations.

In another embodiment of the storage and installation device according to the first aspect of the invention having vertical stands, radial bars define prepositioned locations for allocating a number of seismic stations. In one alternative, each radial bar is hingedly attached to the vertical stand in order that when the radial bar does not accommodate seismic stations the radial bars can be pivoted towards the stand to which is attached. In yet another alternative, a stand has a recess designed so that a radial bar may slide into said recess after being pivoted towards the stand.

In a second aspect of the invention, there is described a method of deploying/retrieving a seismic cable array at a subsea location comprising the steps of arranging a storage and installation device according the invention on a vessel, and deploying/retrieving a seismic cable including a plurality of seismic stations from/into said storage and installation device on said vessel.

In a third aspect of the invention, there is described a method of storing a seismic cable comprising first providing a seismic cable array which includes a number of seismic stations, and then arranging said array in a storage and installation device according to the invention.

The method according to the third aspect of the invention may in one embodiment comprise arranging said array with seismic stations in a single layer arrangement.

In a further embodiment of the method according to the third aspect of the invention, the seismic stations are arranged in prepositioned locations, the prepositioned locations defining the orientation of the seismic stations using arrangement details.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
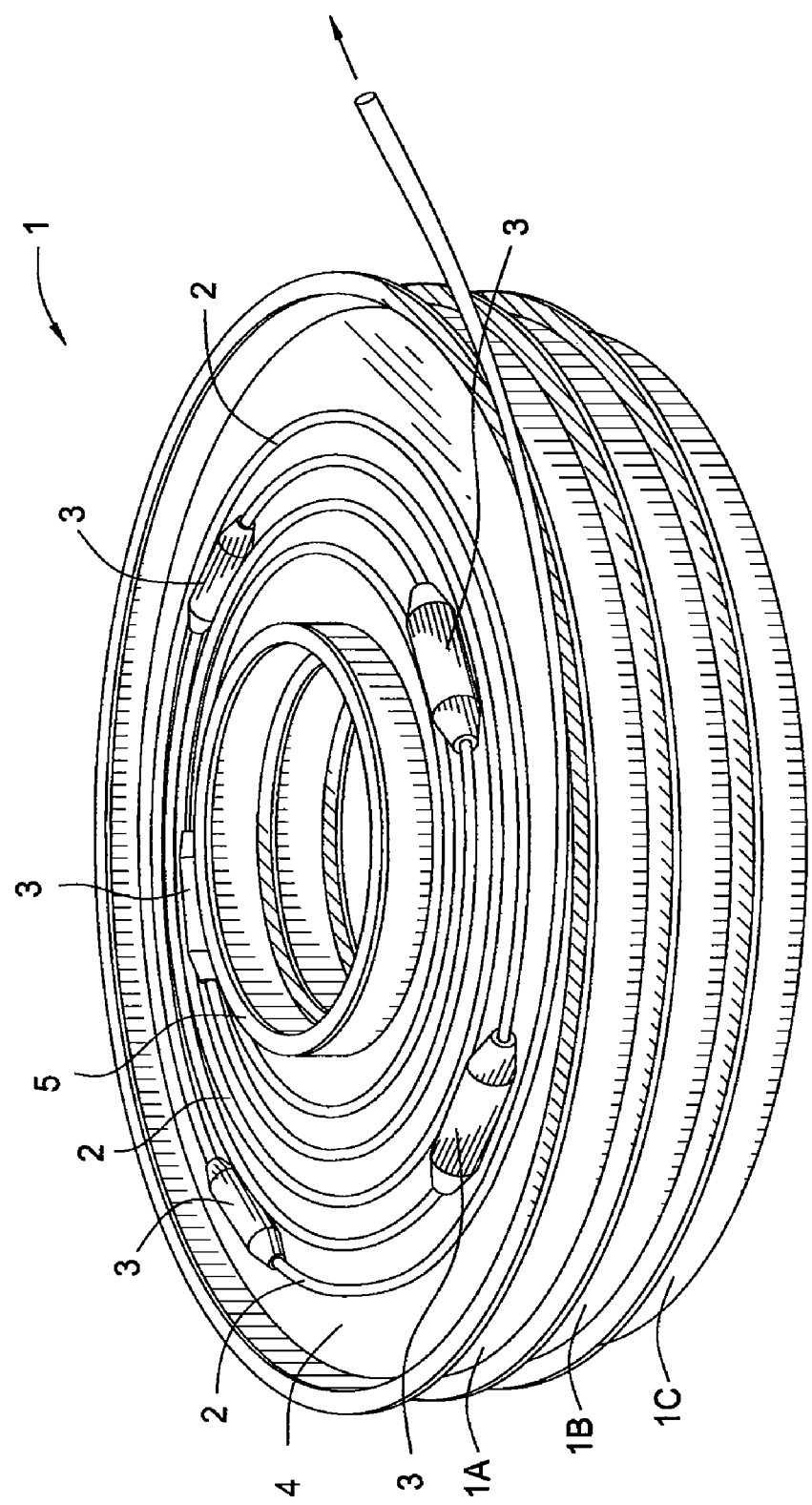
FIG. 1 illustrates an example embodiment of a storage and installation device and a cable arrangement according to the invention wherein three low profile baskets are stacked on top of each other, each basket containing a coiled section of a seismic cable having a number of seismic stations.

FIG. 1 illustrates a storage and installation device according to the invention and to be used with a seismic cable, realized as a stack 1 of low profile baskets (a stack of three baskets 1A, 1B, and 1C are shown), each basket capable of storing a length of seismic cable 2 with seismic stations 3. A set of stacked baskets 1 can be adapted to be mountable onto a turntable for allowing a rotation of the stack of baskets 1 during deployment and retrieval operations. In such operations, the seismic cable and seismic stations are lifted out of or stored into the baskets 1. Preferably, each basket in the stack has a low profile, i.e. the height of the internal storage volume is typically comparable to or somewhat larger than a cross section of a seismic station, whereby the possibility for tangling of the seismic cable during the handling of the baskets is significantly reduced. For mounting onto a turntable, at least the lowermost basket in a stack of baskets is equipped with mounting details designed to cooperate, possibly in a locking fashion, with corresponding basket holding details on the turntable.

Figure 2:
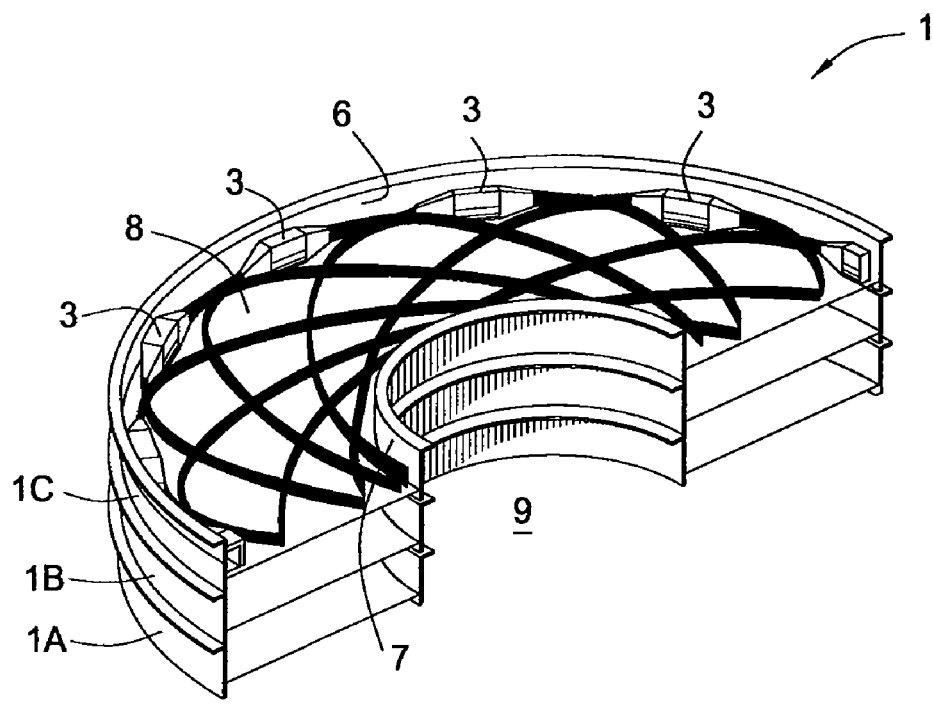
FIG. 2 shows one embodiment of a storage and installation device according to the invention where separate compartments contain a seismic cable coiled in a substantially horizontal fashion in such a manner that the seismic stations of the seismic cable are aligned with the inside of an outer peripheral wall of the compartment.
Figure 3:
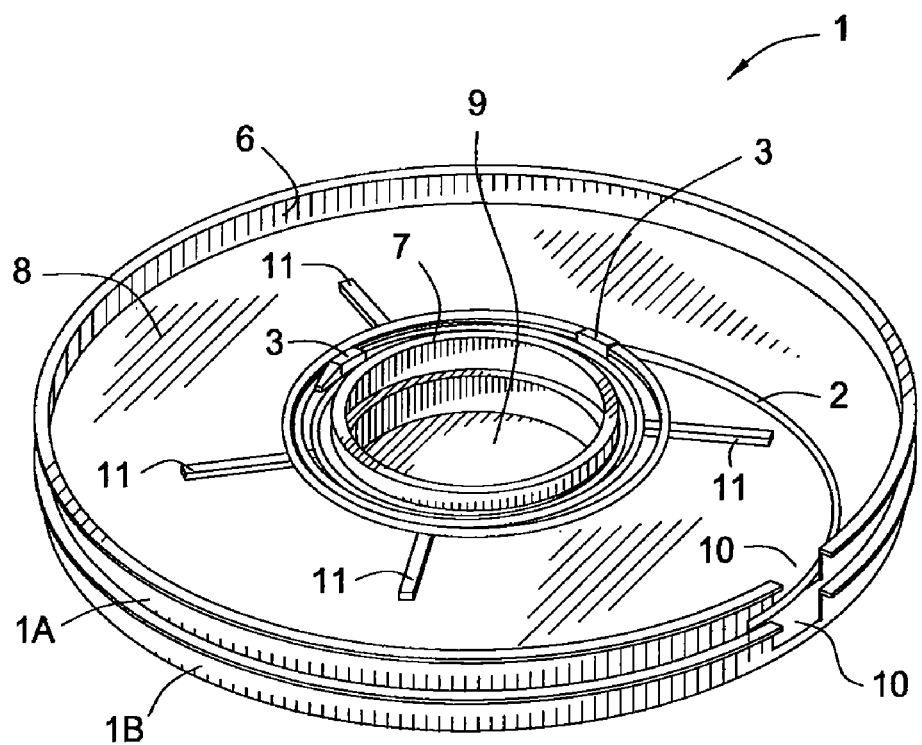
FIG. 3 shows one embodiment of a storage and installation device according to the invention where each low profile basket contains a seismic cable coiled in a spiral fashion in a single layer about a center part of a basket.

In one preferred embodiment of the storage or installation device according to the invention, the low profile basket (1A, 1B, and/or 1C) holds seismic stations 3 which are arranged side-by-side or one after another in a single layer as indicated in FIG. 1. During normal storage and operation, this single plane is preferably arranged horizontally. The single layer design ensures a problem free unloading, as the single layer design effectively prevents one seismic station from being placed below other seismic stations and potentially being trapped by other seismic stations. In order to enable easy coiling of an asymmetric seismic cable and stations, the cable and stations can be arranged in a sideways oriented fashion, as illustrated in FIG. 2 and FIG. 3. A number of such low profile baskets 1 may be placed on top of each other, possibly locked together using some form of basket locking means in order to make it possible to store and install a large number of seismic stations 3 and a relatively long cable array.

The baskets 1 are in one embodiment shaped so that a top of one basket matches a bottom of another basket in order that a number of such low profile baskets 1 can be readily and efficiently stacked on top of each other as illustrated on FIG. 1.

As one alternative arrangement, the seismic stations 3 can be placed along an outer region 4 of the low profile basket 1 while the seismic cable 2 interconnecting the seismic stations 3 are loosely wound around an inner region 5 of the low profile basket. This design of the storage and installation basket 1 yields a systematic packing arrangement for the cable array, while at the same time minimizing the risk that one seismic station becomes trapped between several other seismic station, thereby causing problems when unloading the cable array from the storage and installation device.

FIG. 2 and FIG. 3 illustrate a storage and installation device 1 according to the invention for storing and deploying/retrieving a seismic cable having a non-circular cross section, for example a near rectangular cross section.

FIG. 2 illustrates seismic stations 3 arranged along the outer peripheral wall 6 of a basket 1. Such an embodiment is possible, provided that the height of the containers 1A, 1B, 1C is made sufficiently large in comparison to the cross sectional dimensions of the seismic cable to enable the cable to cross a number of times inside the container. Typically, such a design would be advantageous when the dimension of the seismic stations 3 is fairly large compared to the cross sectional dimensions of the cable 2.

The inside of the outer peripheral wall 6 can in some embodiments of the invention be equipped with seismic station fastening details in order to releasably fasten the seismic stations 3 in predetermined positions inside the container.

FIG. 3 illustrates an embodiment of a storage and installation device according to the invention where two cable baskets 1A, 1B have correspondingly shaped bottom and top parts in order that the second container 1B fits on top of the first container 1A, in such a way that the bottom of the second container 1B thus forms the top of the first container 1A.

The cylindrical cable baskets 1A, 1B each define an interior volume defined by a basket bottom 8 and an outer cylindrically shaped peripheral wall 6 of the basket and an inner cylindrically shaped inner wall 7. Each basket defines a centrally located void 9 for allowing the mounting of the baskets on a common mount, the void 9 could for example be cylindrically shaped to allow for the mounting of the baskets onto a cylindrically shaped spindle entered into void 9. Inside the basket there are four spokes 11 arranged to lie in a radial direction outwardly from the inner wall 7. The purpose of the spokes is to build a structure which the seismic cable 2 can rest upon while allowing sufficient room between the spokes for the seismic stations 3. The space between the spokes thus can have sufficient height to allocate a seismic station 3 while the seismic cable 2 continues essentially in the same plane all the way around the inner wall 7. The seismic cable 2 is in this example coiled in a spiral fashion from the inner wall section 7 outwardly towards the peripheral wall section 6. The container 1B is designed to have a height which is sufficiently high to accommodate one layer of seismic stations 3. Effectively, such a height enables the baskets 1A, 1B to contain the seismic stations 3 in one layer, thus reducing significantly the risk of entangling the seismic cable 2.

Figure 4:
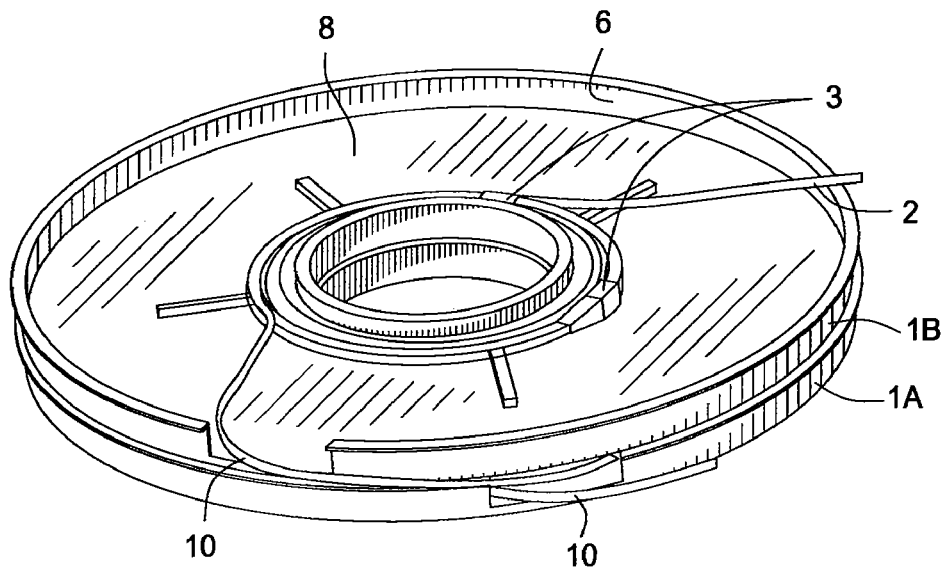
FIG. 4 illustrates the arrangement of a seismic cable in a continuous manner from one basket to another basket in a stack of two similar baskets.

FIG. 3 demonstrates another advantageous feature of the invention. The outer peripheral wall 6 of the baskets 1A, 1B provided an opening 10 of sufficient dimensions in order that the seismic cable 2 with the seismic stations 3 runs continuously between a first cable basket 1A and a second cable basket 1B. FIG. 4 illustrates in more detail how the seismic cable 2 passes from a first cable basket 1A to a second cable basket 1B. When the first cable basket 1A has been filled with sufficient length of seismic cable 2, the cable is led out of the first cable basket 1A via an opening in the rim wall 6 of the first cable basket 1A, after which the cable is led into a corresponding opening of the second basket. Inside the second basket 1B, the seismic cable 2 entering through the opening 10 is preferably arranged along the basket bottom 8 into the center of the second basket 1B, where the cable is then subsequently wound around the inner wall 7 of the second basket in an outwardly spiraling fashion. When even the second basket 1B has been filled with seismic cable, a third cable basket could be arranged on top of the stack of baskets in a similar fashion as the second cable basket 1B is placed on top of the first cable basket 1A.

When deploying seismic cable 2 form a stack of cable baskets 1A, 1B the seismic cable is lifted out of the top basket until the top basket is empty, after which the top basket is removed, thereby revealing another cable basket containing another length of seismic cable to be deployed.

In typical deployment situations, the seismic cable is pulled, more or less automatically by suitable cable pulling means, out of the storage and installation devices, and continuously fed or transported on some form of suitable transport means, for example in the form of a linear rail guide. For this purpose, the seismic cable is preferably equipped with some form of suspension means, which could either be a continuous suspension feature running along the length of the seismic cable or a series of discrete suspension devices, as integrated parts of the seismic cable or as devices which are attached, possibly in a releasable manner, to the seismic cable, and located at spaced apart locations along the cable. Such suspension devices can typically be combined with the seismic stations which are normally also located at spaced apart locations along the length of the seismic cable. The advantage of combining such suspension devices with the seismic stations is that the suspension device can be used to hold the seismic stations in a given orientation and to guide the seismic stations along a given path with a given orientation.

Figure 5:
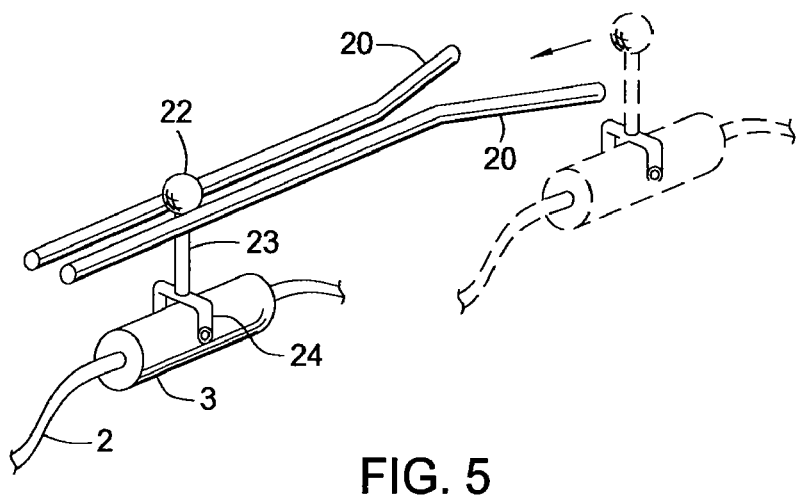
FIG. 5 illustrates part of a seismic cable having a seismic station being suspended in a linear rail guide during a deployment operation.

FIG. 5 illustrates a possible example of a seismic cable 2 suspended in a linear rail guide 20 based on two closely arranged, substantially parallel, elongated members with a spacing therebetween. A seismic station 3 on the seismic cable 2 is provided with suspension means comprising a ball shaped element 22 fixed to one end of a pin 23, and the other end of the pin being hingedly attached to the seismic station using for example a clamp-like structure 24 with a hinging feature attached to the seismic station. The hinge attachment can be designed in such a way that the ball shaped element 22 and the pin 23 can be pivoted between a first position (not illustrated) where the ball and pin is aligned with the cable when the seismic cable is stored in the cable storage and installation baskets according to the invention, and a second position where the pin extends in a substantially perpendicular fashion outwardly from the seismic station when the seismic cable is hanging in the linear rail guide device. The ball shaped element 22 of the suspension has a dimension larger than the spacing between the elongated members of the linear rail guide in order to retain the ball in the guide.

The seismic stations are picked up from the installation baskets either by manual assistance in a procedure where a person assists in the pick-up process, or the stations could be picked up from the installation basket by automatic pick-up means. Because the seismic stations stored in the basket are arranged in a single layer type arrangement in each low profile basket, an automatic pick-up arrangement can be arranged to catch and hold, in a releasable fashion, the suspension means of the seismic station, possibly by gripping the ball shaped element 22.

An automatic cable pulling device which is arranged to pull the seismic cable out of the storage and installation baskets according to the invention can be designed to hold the seismic stations using their suspension means, such that the orientation of the seismic station may be controlled during the pullout operation, provided that the pull out means are suitably adapted to mechanically couple to the suspension means on the seismic station as early as possible when orientation of the seismic stations being pulled out of the storage and installation baskets still has a predictable orientation. Typically, the cable pulling means couple to the seismic station suspension means as soon as the seismic station is lifted out of the storage and installation basket. Hence, the suspension means are used to control how the seismic station and the attached cable is oriented while being suspended onto the linear rail guide, as shown in FIG. 5. As a result, the use of a storage and installation basket according to the invention, where the orientation of the seismic stations are prepositioned for easy deployment, in combination with a linear guide arrangement which is adapted for maintaining the orientation of the seismic station even when the seismic station is guided along the linear guide rail results in a efficient deployment system. As a desirable and beneficial consequence, the resulting deployment of a seismic cable having seismic stations arranged along the cable where the orientation of the seismic cable is predictable reduces uncertainties in the orientation of the cable and seismic stations to a large degree, thereby avoiding too unpredictable, or even a completely random, orientation of the cable and seismic station, a property which in many situations is undesirable as it increases the probability of mechanically entanglement of the seismic cable.

In this context, a seismic station is intended to mean a unit containing any kind and number of seismic sensor, including accelerometers and pressure sensors, at least one of which is a fiber optic sensor.

Figure 6:
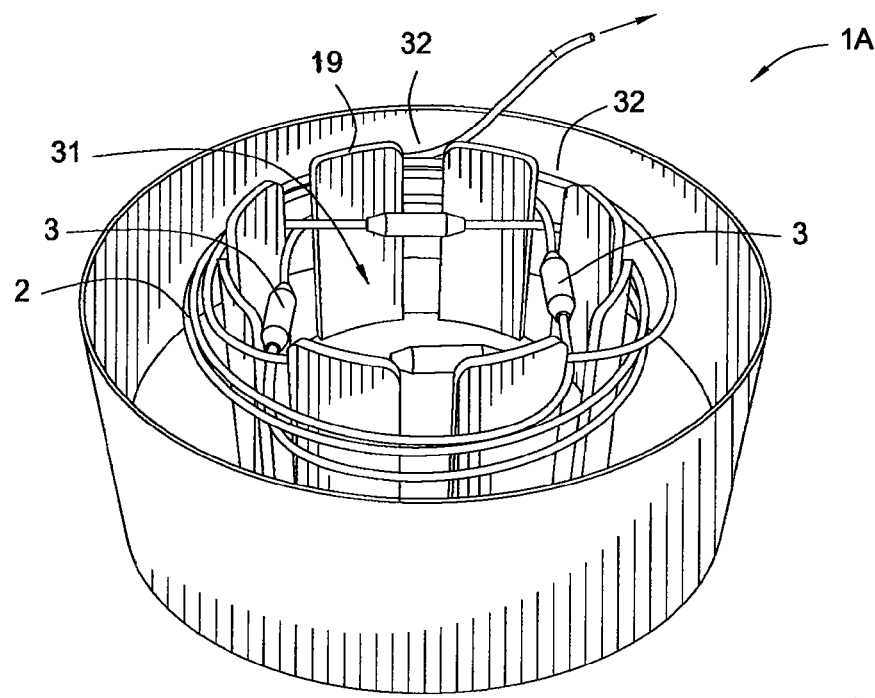
FIG. 6 shows an example embodiment of a storage and installation device according to the invention adapted to allocate a seismic cable which is coiled inside a basket in such a manner that the seismic stations are located in a center volume of the basket.

In an alternative embodiment of a storage and installation device according to this invention, the seismic stations 3 of the seismic cable 2 can be arranged at different predetermined locations in a center space 31 of the basket, as illustrated by the example embodiment shown in FIG. 6. In a basket 1A, a center volume 31 is defined by a center element 19, possibly cylindrically shaped, of the basket 1, for example by making the said center element 19 hollow or partially hollow to define an open center volume 31 where the seismic stations could be arranged as illustrated in FIG. 6. Inside the center space 31 several seismic stations 3 can be located in a side-by-side manner or on top of each other. The seismic cable 2 thus necessarily has to pass through openings 32 in the cylindrical element 19 defining a center void in the basket, in order to reach the locations of the seismic stations. This embodiment of the storage and installation device according to the invention thus provides a seismic cable basket 1 capable of allocating an ordered arrangement of a number of seismic stations 3 interconnected by a seismic cable 2. Details of the seismic cable storage basket 1 arrange the seismic stations in predetermined positions and orientations at or near the center of the basket 1. This embodiment of the storage and installation device according to the invention also provides the possibility of a layered arrangement of a number of seismic stations 3 interconnected by sections of seismic cable 2.

Figure 7:
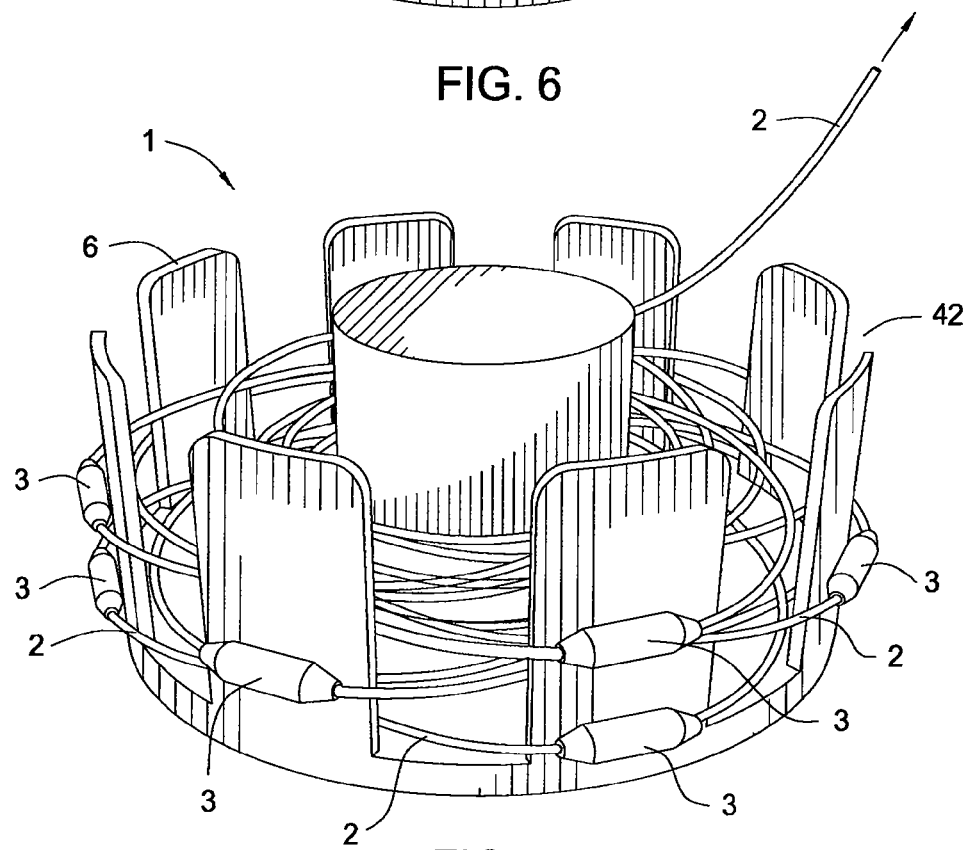
FIG. 7 illustrates an example embodiment of a storage and installation device according to the invention adapted to allocate a seismic cable in a basket which holds a coiled seismic cable with a number of seismic stations in such a manner that the stations are positioned along a peripheral section of the basket.

One embodiment of a storage and installation device according to the invention can be adapted to arrange seismic stations 3 along or on the peripheral wall 6 of the basket 1, as illustrated by the example embodiment shown in FIG. 7. The outside of the basket or container 1 defines a fairly large area along which a number of seismic stations 3 can be arranged. The seismic cable 2 and the seismic stations 3 are retained by retaining details defined by the peripheral wall 6, for example in the form of slits or openings 42 in the peripheral wall which the seismic cable may pass through. In this way, the seismic stations 3 are suspended on the outside of the peripheral wall 6, while the cable 2 to the stations 3 passes through the openings 42 in the peripheral wall 6.

A person of ordinary skill in the art will understand that several of the embodiments of the installation baskets and seismic cable storage arrangements described in this invention provide significant flexibility in that the baskets can accommodate a variation of lengths of cable between each pair of seismic stations. However, the dimensions and shape of the basket always results in some degree of pre-positioning of the seismic stations. The arrangement of the seismic cable in a spiraling fashion outwardly from the center of the basket, as illustrated in FIG. 3, helps to ensure that the seismic station has a given orientation in the cases of non-circular geometries.

In this way, however, it is possible to obtain a flexible mounting system defining a variety of pre-positioned locations of the seismic stations 3 and the seismic cable 2 inside the basket 1 where their orientation is defined and a leveling is obtained in a simplified manner. If the basket has a high profile, there can be space for a number of stations along the peripheral wall 6, if only one layer as will be seen from FIG. 7.

Figure 8:
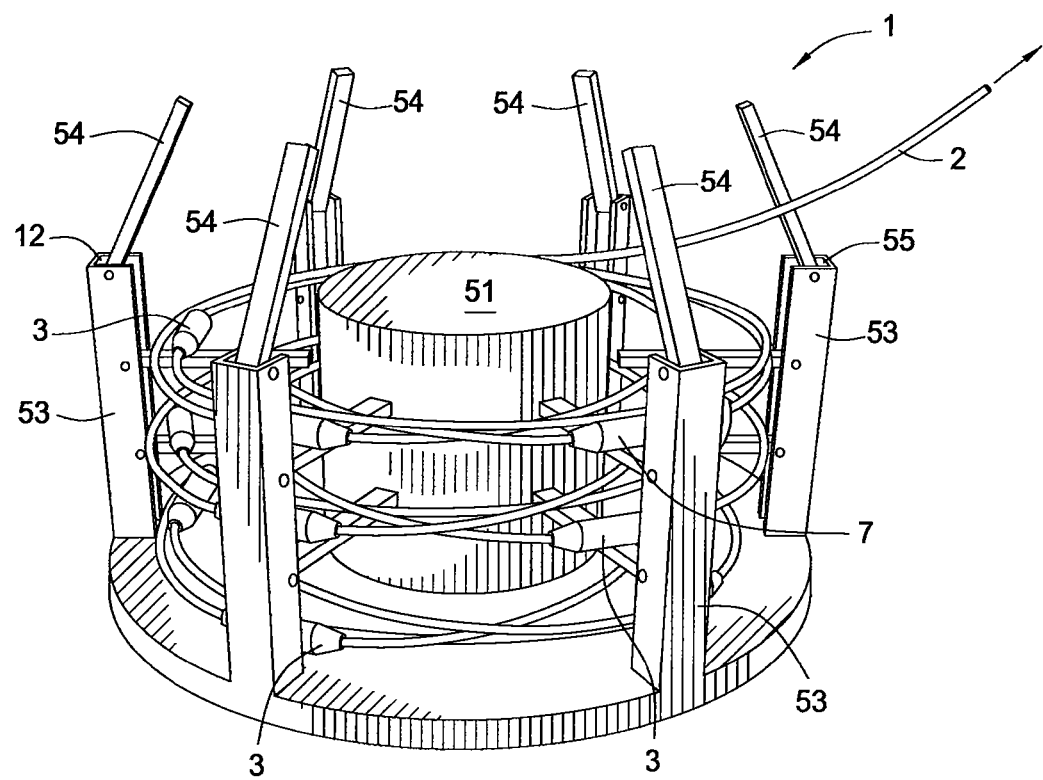
FIG. 8 shows an example embodiment of a storage and installation device according to the invention in the form of a basket having vertical stands, horizontal bars arranged between the vertical stands and a center element, all being part of a basket (not shown) whereby seismic stations on the seismic cable may be carried by or releasably fastened to the horizontal bars.

In another embodiment of a storage and installation device according to this invention, a layering of the seismic stations 3 is obtained using specially designed stands 53, preferably vertically aligned, with radial bars 54, possibly hinged either to one of the stands 53 or to a cylindrical center part 51, as illustrated by the example embodiment in FIG. 8. The stands 53 and the center element 51 are normally mounted on a bottom plate or fixed to a common mounting frame of some form. For simplicity, the bottom plate or mounting frame is not illustrated in FIG. 8, and a person skilled in the art will understand that the bottom plate or a mounting frame can have a number of different designs. In FIG. 8, there is shown a radial bar 54 hinged to a stand 53. FIG. 8 shows a relatively small number of vertical stands 53; however, there may typically be more stands around the periphery of the basket to define the outer circle of the basket 1 and to hold the seismic cable inside the basket. In an alternative, the seismic stations 3 could be attached or clamped, in a releasable manner, to the bars 54. During deployment of the seismic cable 2 the radial bars 54 are tilted to a vertical position when one layer of the coiled seismic cable has been deployed, in order to allow the next layer to be lifted up and deployed. In one alternative, the stands 53 are designed with internal channels 55 into which the radial bars 54 may drop after being raised to an upright position, thereby avoiding that the bars 54 interfere with further handling of the seismic cable 2. Storage and installation baskets based on vertical stand could in an alternative also be arranged in a stacked fashion, in a manner similar to the stacked arrangement in FIG. 1.

Figure 9A:
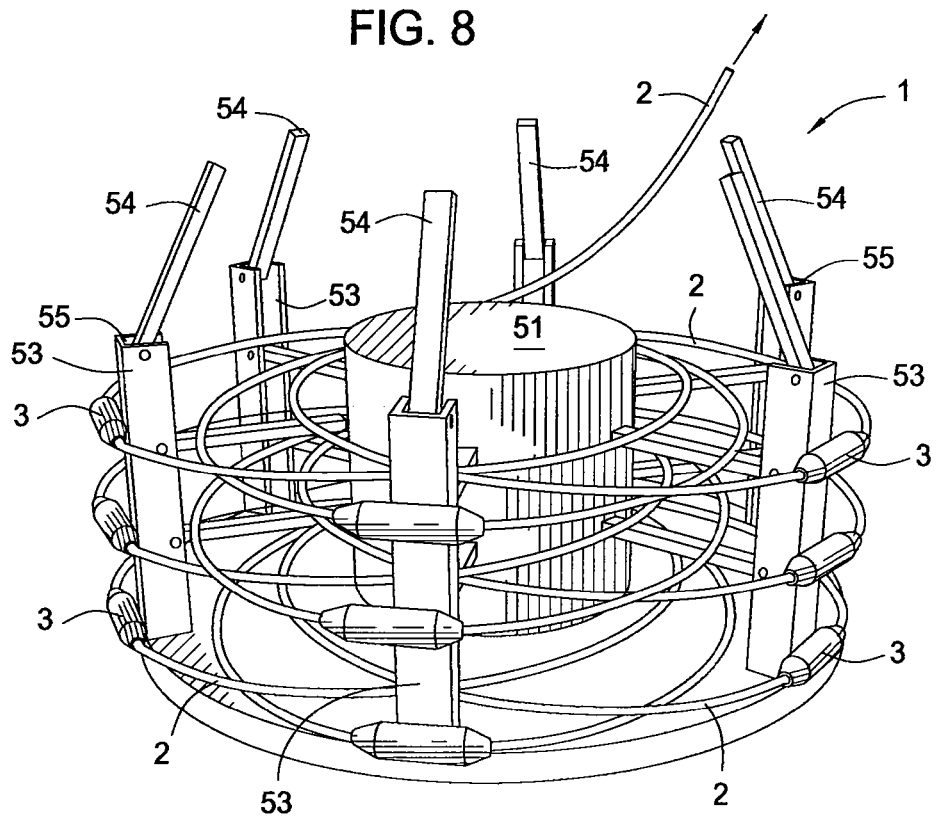
FIGS. 9A and 9B show one example embodiment of a storage and installation device according to the invention which is adapted to accommodate a seismic cable in such a manner that seismic stations are carried by one or more vertical stands.
Figure 9B:
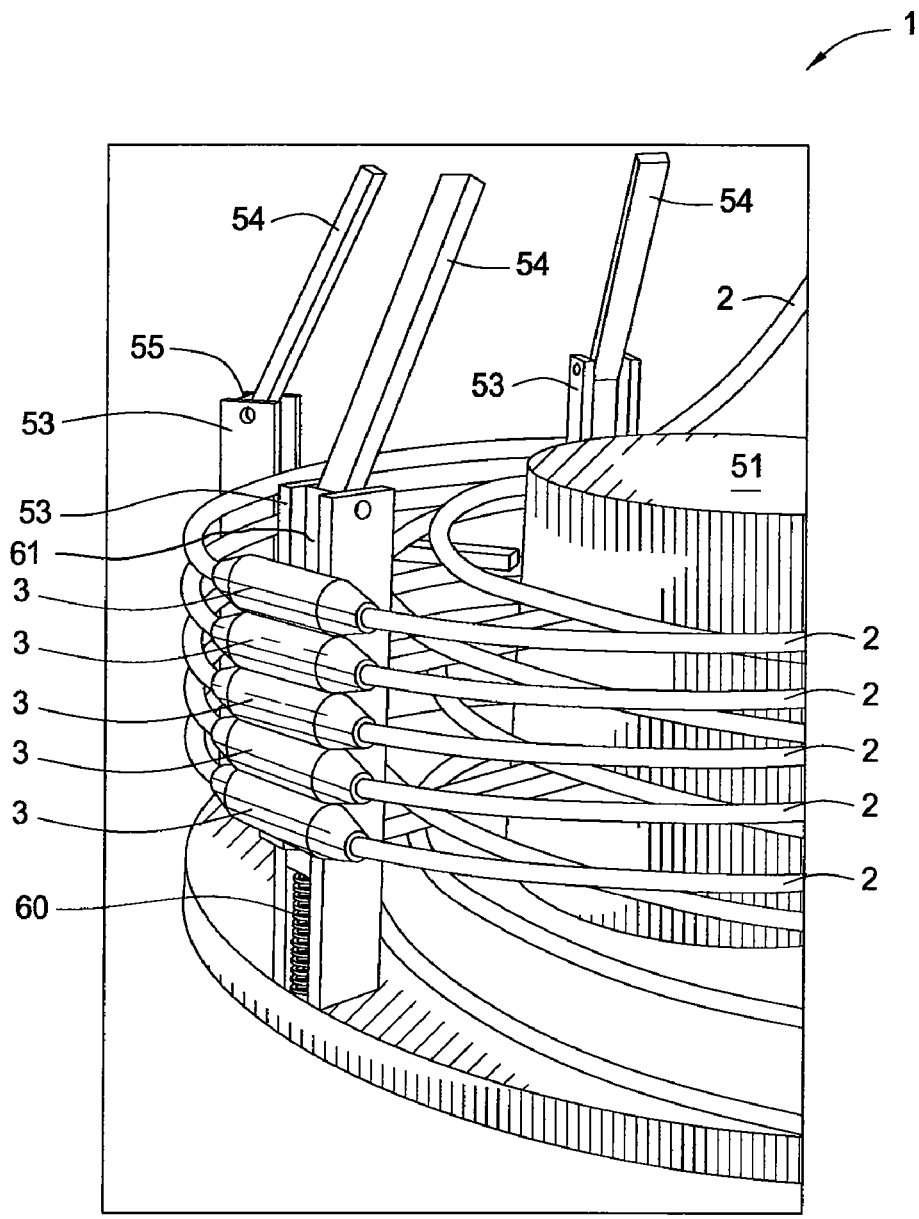

In one embodiment of the container according to the invention, the placement of the seismic stations 3 on the outside of the basket or container 1 can be combined with special stands 53 as illustrated in FIGS. 9A and 9B. In this case, all the seismic stations 3 are arranged on the "external" face of the stand 53, that is, along a part of the exterior surface of the stand 53, said part of the exterior surface facing away from the cylindrical center part 51. The stand 53 could be provided with a guiding grove 61 into which a corresponding guide detail on the seismic station could be entered, possibly in a sliding fashion. Further, the guiding groove 61 could be provided with an internal spring 60 for providing an upwards pushing force on the stack of seismic stations 3 via the guide details of the seismic stations in order to make it easier to lift the seismic stations 3 loose from the groove 61.

The storage and installation baskets according to the invention provide major benefits during the installation of the seismic system. The present invention makes it possible to stack a sufficiently large number of cable baskets on top of each other to provide a long cable length and to reduce as much as possible the number of required splices/couplers. The seismic cable 2 having seismic stations 3 may be divided in sections, each section transported in a separate storage and installation basket according to the invention. In this way, a ship or vessel does not have to be loaded with all of the seismic cable at a factory or harbor location. The seismic cable can be preloaded into a number of storage and installation baskets according to the invention, whereby a supply vessel may transport as many baskets as required at one time to an installation vessel at an offshore location. The installation vessel does not have to carry all of the seismic cable from the onset of the installation operation. If the installation vessel cannot take all the cable arrays required for an installation, a more convenient transport vessel can bring new units (one or more storage and installation baskets 1) preloaded with seismic cable 2 and seismic stations 3 to an offshore location during an installation period.

Similarly, if a failure is detected subsea during installation of the seismic cable, the installation can be interrupted and the seismic cable (array) may have to be rewound back onto the vessel. Sections of the seismic cable 2 are then typically placed back into storage and installation baskets 1 in an arrangement as before the seismic cable was deployed.

Further, the use of storage and installation baskets 1 according to the invention means that the seismic cable 2 can be reliably deployed, without risk of tangling the cable and seismic stations.

The storage or installation baskets 1 according to the invention can be provided with shelves or magazines for storing, protecting, and holding the seismic stations 3 during shipment of the baskets 1 and during installation operations. Further, the baskets may be provided with devices for attaching the baskets to a transport vessel, for example to the deck of a ship.

The storage and installation baskets 1 according to the invention can be circular in shape, and the baskets may be designed to allocate and contain the required volume and weight of a reasonable length and weight of a cable array.

Typically, the storage and installation basket 1 according to the invention is provided with a fastening device in order to fasten or clamp the basket to the deck of a vessel. In addition, the storage and installation basket 1 according to the invention can be mounted onto a rotation table so that it can rotate while deploying or storing a cable.

While the foregoing is directed to embodiments of the present invention, other and further embodiments of the invention may be devised without departing from the basic scope thereof, and the scope thereof is determined by the claims that follow.

The invention claimed is:

1. A seismic cable storage and installation system for use in storage, deployment or retrieval of a seismic cable array, comprising:
   one or more baskets adapted for being stacked, wherein each basket is dimensioned to allocate, in an ordered arrangement, a number of seismic stations interconnected by sections of seismic cable; and
   wherein the seismic stations are arranged in prepositioned locations, the prepositioned locations defining the orientation of the seismic stations using arrangement details.

2. The storage and installation system according to claim 1, wherein the ordered arrangement is a single layer arrangement of the seismic stations within each basket.

3. The storage and installation system according to claim 1, wherein the seismic stations have a substantially non-circular cross section in a direction perpendicular to the cable direction.

4. The storage and installation system according to claim 1, wherein the seismic stations have a substantially circular cross section perpendicular to the cable direction.

5. The storage and installation device according to claim 1, wherein the arrangement details comprise a basket center volume defined by a cylindrical center element of each basket.

6. The storage and installation device according to claim 1, wherein the arrangement details comprise slits within a peripheral wall of the one or more baskets for defining the positions of and for holding the seismic stations in the prepositioned locations in relation to said peripheral wall.

7. The storage and installation device according to claim 1, wherein the arrangement details comprise a number of elongated stands that are, in normal use, arranged in a substantially parallel, vertically upright fashion, the stands being adapted to hold the seismic stations in the prepositioned locations with defined orientations.

8. The storage and installation device according to claim 7, wherein the arrangement details comprise radial bars which define the prepositioned locations for allocating one or more of the seismic stations.

9. The storage and installation device according to claim 8, wherein each radial bar is hingedly attached to a respective one of the stands in order that, when the radial bars do not accommodate the seismic stations, the radial bars can be pivoted towards the stands to which they are attached.

10. The storage and installation device according to claim 8, wherein one of the stands has a recess designed so that a corresponding one of the radial bars may slide into said recess after being pivoted.

11. A method of deploying/retrieving a seismic cable array at a subsea location, comprising:
   arranging a storage and installation device on a vessel, wherein the device includes one or more baskets adapted for being stacked, each basket dimensioned to allocate, in an ordered arrangement, a number of seismic stations interconnected by sections of seismic cable;
   arranging the seismic stations in prepositioned locations, the prepositioned locations defining the orientation of the seismic stations using arrangement details; and
   deploying/retrieving the cable including the seismic stations from/into said storage and installation device on said vessel.

12. The method according to claim 11, wherein each basket includes the arrangement details in the form of slits within a peripheral wall of the one or more baskets for defining the positions of and for holding the seismic stations in the prepositioned locations in relation to said peripheral wall.

13. A method of storing a seismic cable, comprising:
   providing a seismic cable array which includes a number of seismic stations; and
   arranging said array in a storage and installation device, wherein the device includes one or more baskets adapted for being stacked, each basket dimensioned to allocate, in an ordered arrangement, the seismic stations interconnected by sections of cable; and
   arranging the seismic stations in prepositioned locations, the prepositioned locations defining the orientation of the seismic stations using arrangement details.

14. The method according to claim 13, wherein said array is arranged with the seismic stations in a single layer arrangement.

15. The method according to claim 13, wherein each basket includes the arrangement details in the form of slits within a peripheral wall of the one or more baskets for defining the positions of and for holding the seismic stations in the prepositioned locations in relation to said peripheral wall.

* * * * *